United States Patent
Svitak

(10) Patent No.: US 11,842,591 B2
(45) Date of Patent: Dec. 12, 2023

(54) PARKING FACILITY COMMUNICATION SYSTEMS AND METHODS

(71) Applicant: SpotHero, Inc., Chicago, IL (US)

(72) Inventor: Gregory Stephen Svitak, Chicago, IL (US)

(73) Assignee: Spothero, Inc., Chicago, IL (US)

( * ) Notice: Subject to any disclaimer, the term of this patent is extended or adjusted under 35 U.S.C. 154(b) by 0 days.

(21) Appl. No.: 16/988,112

(22) Filed: Aug. 7, 2020

(65) Prior Publication Data
US 2021/0043021 A1    Feb. 11, 2021

Related U.S. Application Data

(60) Provisional application No. 62/883,972, filed on Aug. 7, 2019.

(51) Int. Cl.
| | |
|---|---|
| G07C 9/15 | (2020.01) |
| G07C 9/10 | (2020.01) |
| G07C 9/38 | (2020.01) |
| H04W 4/80 | (2018.01) |

(Continued)

(52) U.S. Cl.
CPC ............... *G07C 9/38* (2020.01); *G07B 15/02* (2013.01); *H04W 4/44* (2018.02); *H04W 4/80* (2018.02)

(58) Field of Classification Search
CPC .......... G08G 1/14; G08G 1/148; G08G 1/164; G08G 1/147; G08G 1/146
See application file for complete search history.

(56) References Cited

U.S. PATENT DOCUMENTS

| | | | |
|---|---|---|---|
| 9,997,070 B1 * | 6/2018 | Komanduri | H05B 47/195 |
| 10,326,518 B1 * | 6/2019 | Magley | H04W 80/06 |
| 10,543,809 B1 * | 1/2020 | Carney Landow | G08G 1/042 |

(Continued)

FOREIGN PATENT DOCUMENTS

| | | | |
|---|---|---|---|
| CN | 106657612 A | * | 5/2017 |
| CN | 107993478 B | | 5/2019 |

OTHER PUBLICATIONS

S. A. A'ssri, F. H. K. Zaman and S. Mubdi, "The efficient parking bay allocation and management system using LoRaWAN," 2017 IEEE 8th Control and System Graduate Research Colloquium (ICSGRC), Shah Alam, 2017, pp. 127-131, doi: 10.1109/ICSGRC.2017.8070581.

*Primary Examiner* — Hai Phan
*Assistant Examiner* — Son M Tang
(74) *Attorney, Agent, or Firm* — Dinsmore & Shohl LLP

(57) ABSTRACT

Embodiments herein are directed a vehicle authorization system for a parking facility. The system includes a gate assembly and a communication system. The gate assembly includes a gate, a gate actuator configured to move the gate, and a gate controller that receives and transmits wireless long range signals. The gate controller is configured to actuate the gate actuator to move the gate. The communication system includes a remote server computing device that is positioned offsite of the parking facility and a gateway device positioned at the parking facility and communicatively coupled to the gate controller and to the remote server computing device. The remote server computing device provides the wireless long range signals to the gate controller via the gateway device such that a construction material of the parking facility and the housing of the gate assembly minimally interferes with the wireless long range signals.

17 Claims, 4 Drawing Sheets

(51) Int. Cl.
*H04W 4/44* (2018.01)
*G07B 15/02* (2011.01)

(56) References Cited

U.S. PATENT DOCUMENTS

| | | | |
|---|---|---|---|
| 2011/0099126 A1* | 4/2011 | Belani | G08G 1/14 |
| | | | 705/418 |
| 2012/0143401 A1* | 6/2012 | Jayadevappa | E05B 47/026 |
| | | | 701/2 |
| 2012/0143657 A1* | 6/2012 | Silberberg | G06Q 30/0207 |
| | | | 705/14.1 |
| 2012/0173900 A1* | 7/2012 | Diab | H04L 12/40045 |
| | | | 713/310 |
| 2012/0191242 A1* | 7/2012 | Outwater | B60L 53/30 |
| | | | 700/236 |
| 2014/0213176 A1* | 7/2014 | Mendelson | G08C 17/02 |
| | | | 455/39 |
| 2014/0365359 A1* | 12/2014 | Wilson | G07C 9/37 |
| | | | 705/39 |
| 2015/0138001 A1* | 5/2015 | Davies | G08G 1/0175 |
| | | | 340/932.2 |
| 2016/0042575 A1* | 2/2016 | Ganguly | G07B 15/02 |
| | | | 705/13 |
| 2016/0140846 A1* | 5/2016 | Outwater | G08G 1/144 |
| | | | 340/932.2 |
| 2016/0163197 A1* | 6/2016 | Levy | G08G 1/144 |
| | | | 340/932.2 |
| 2017/0098374 A1* | 4/2017 | Sullivan | G08G 1/0129 |
| 2017/0116790 A1* | 4/2017 | Kusens | G08G 1/142 |
| 2017/0345305 A1* | 11/2017 | Zheng | G08G 1/149 |
| 2018/0248983 A1* | 8/2018 | Mohebbi | H04W 88/10 |
| 2019/0043356 A1* | 2/2019 | Subramanya | H04W 12/61 |
| 2019/0147743 A1* | 5/2019 | Kamini | G06T 7/70 |
| | | | 348/118 |
| 2019/0215369 A1* | 7/2019 | Pry | H04W 12/02 |
| 2019/0224509 A1* | 7/2019 | Goyette | A62C 37/36 |
| 2020/0090515 A1* | 3/2020 | Torres | G08G 1/14 |
| 2020/0242934 A1* | 7/2020 | Xu | G01C 21/3685 |
| 2020/0365021 A1* | 11/2020 | Hano | G08G 1/005 |

* cited by examiner

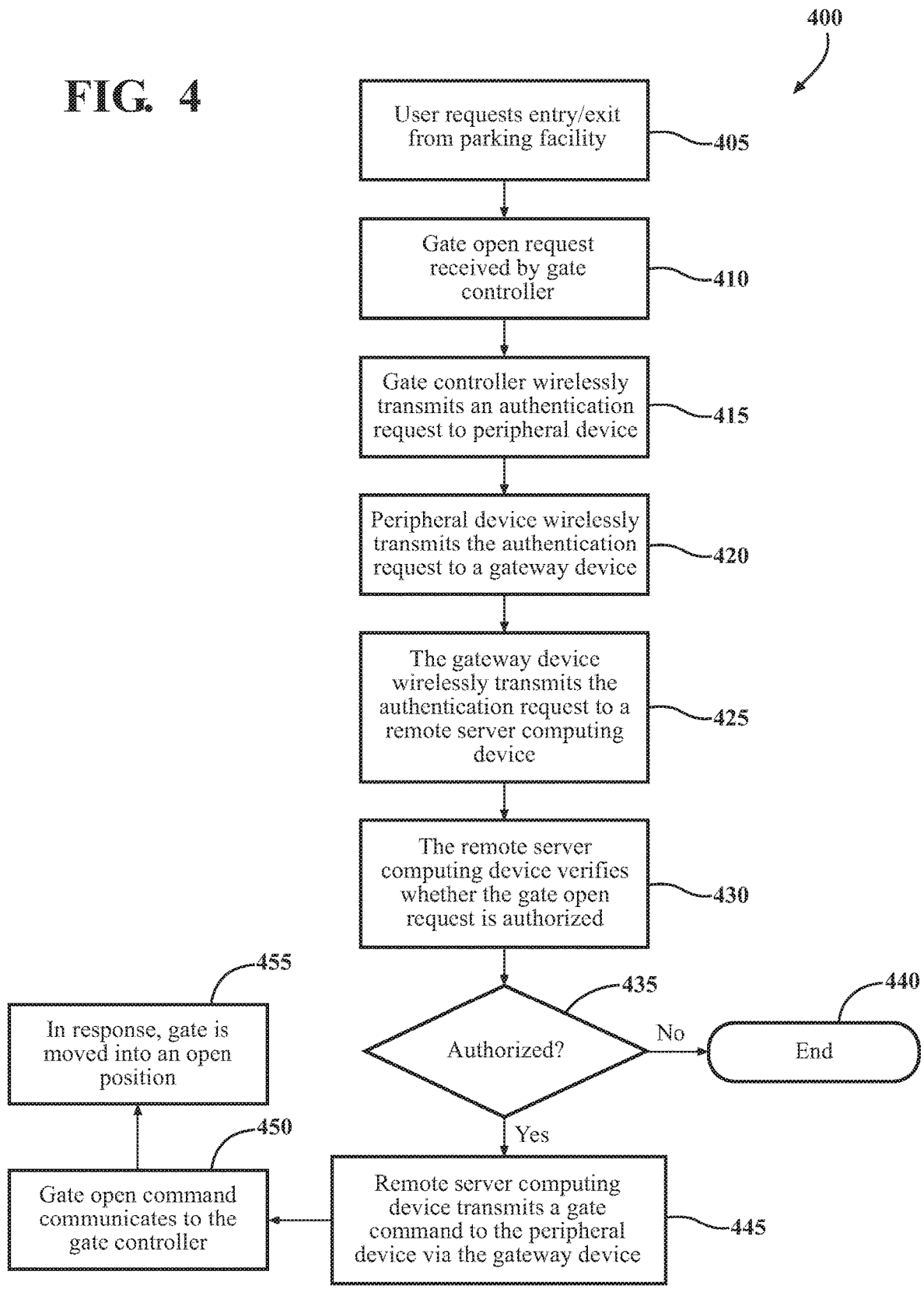

PARKING FACILITY COMMUNICATION SYSTEMS AND METHODS

CROSS-REFERENCE TO RELATED APPLICATION

The present application claims priority to U.S. Provisional Patent Application Ser. No. 62/883,972 filed on Aug. 7, 2019, and entitled "Gated Parking Facility Communication Systems and Methods," the contents of which are incorporated herein in its entirety.

TECHNICAL FIELD

The present disclosure generally relates to the field of parking facility communication. More particularly, disclosed embodiments relate to parking facility communication systems and methods with a remote server located offsite that receives and provides wireless communications with a gate controller.

BACKGROUND

Gated parking facilities provide the ability for a user to park a vehicle for a period of time. Generally, gated parking facilities use a gate assembly that permits certain cars to enter, such as those with reservations, parking tickets, those that have paid to use the garage, and the like. Many of these gate systems communicate with the user via a scanner than scans a barcode on a hard copy parking ticket, an electronic device such as a mobile phone, and the like. Other gated systems communicate with the user, as an example, through a Bluetooth® signal that synchronizes with the user's mobile device to verify the reservation, the paid parking ticket, and the like.

However, gated parking facilities are inherently difficult to have reliable Wi-Fi and cellular wireless communication because of their concrete and metal construction. The gate assemblies are therefore commonly hardwired to communicate with a server positioned onsite. The server may communicate with a device that includes storage, such as a database, and other processing components to verify the barcodes, the Bluetooth® signal for reservations, and the like.

There are several disadvantages to this arrangement. The gate assembly has to be hardwired to the server for power and internet connectivity to alleviate the inherent issues of unreliable wireless communication in parking garages. This requires preplanning and building the parking facility in a manner such that the hardwire cables are installed between the gate assembly and the server. Further, the server needs to be stored onsite to communicate with both the gate system and with the device (i.e., storing and accessing data and programs over the internet). Moreover, gated parking facilities need to use a plurality of antennas to transmit data offsite.

SUMMARY

In one aspect, a vehicle authorization system for a parking facility is provided. The vehicle authorization system includes a gate assembly and a communication system. The gate assembly includes a gate that is movable between an open position and a closed position, a gate actuator configured to move the gate, and a gate controller that receives and transmits wireless long range signals. The gate controller is configured to actuate the gate actuator to move the gate. The communication system includes a remote server computing device that is positioned offsite of the parking facility and a gateway device positioned at the parking facility and communicatively coupled to the gate controller and to the remote server computing device. The gateway device is configured to transmit and receive the wireless long range signals using an ultra-wide band protocol or a long range wide area network protocol. The remote server computing device provides the wireless long range signals to the gate controller via the gateway device such that a construction material of the parking facility and the housing of the gate assembly minimally interferes with the wireless long range signals.

In another aspect, a vehicle authorization system for a gated parking facility is provided. The vehicle authorization system includes a remote server computing device that is positioned offsite of the gated parking facility. The remote server computing device includes at least one processor, a memory communicatively coupled to the at least one processor, and machine readable instructions stored in the memory. The machine readable instructions cause the vehicle authorization system to perform at least the following when executed by the at least one processor: receive an authorization data request from a gateway device, determine whether the authorization data request corresponds to an authorized vehicle in a data storage device, and send a gate command to the gateway device based on whether the authorization data request corresponds to the authorized vehicle in the data storage device. The gateway device transmits the authorization data request to the remote server computing device using an ultra-wide band protocol or a long range wide area network protocol and the remote server computing device transmits the gate command to the gateway device using the ultra-wide band protocol or the long range wide area network protocol such that a construction material of the gated parking facility and a gate thereof minimally interferes with the transmitting and receiving of the gate command.

In yet another aspect, a method for a vehicle authorization system of a gated parking facility is provided. The method includes initiating, by a gate controller, a request for a gate to open, transmitting the request for the gate to open via a gateway device to a remote server computing device using an ultra-wide band protocol or a long range wide area network protocol, and determining, by the remote server computing device, whether the request for the gate to open is an authorized request. The method continues by providing, by the remote server computing device, a gate command to the gateway device based on whether the request for the gate to open is authorized using the ultra-wide band protocol or the long range wide area network protocol and transmitting the gate command to the gate controller via the gateway device. Using the ultra-wide band protocol or the long range wide area network protocol provide an uninterrupted signal such that a construction material of the gated parking facility and a gate thereof minimally interferes with the transmitting and receiving of the request for the gate to open or the gate command.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 depicts a flowchart of an illustrative method of a user initiating a human request for entrance into or to exit the example parking facility of FIG. 2 according to one or more embodiments shown and described herein.

DETAILED DESCRIPTION

Figure 1:
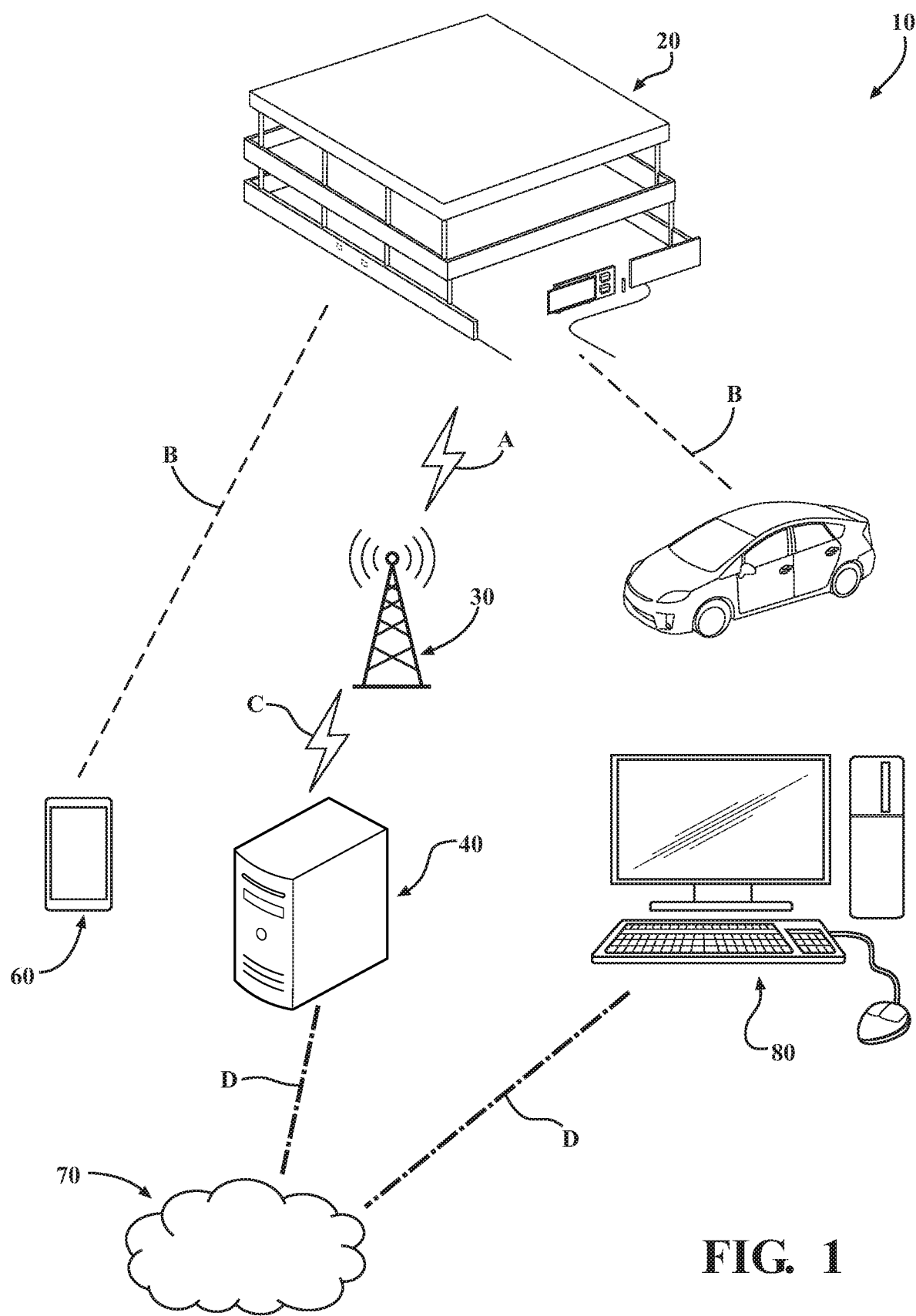
FIG. 1 schematically depicts an illustrative computing network having components for a parking facility communication system according to one or more embodiments described and illustrated herein.

Embodiments of the present disclosure are directed to improved parking facility communication systems and methods. In embodiments of the present disclosure, a gate assembly includes a gate controller that operably controls a gate via a gate actuator and a gate receiver/transmitter device. The parking facility includes a peripheral device, such as a long range receiver/transmitter device, and a gateway device. The gate controller, the peripheral device and the gateway device are each configured to wirelessly communicate amongst one another using an ultra-wide band protocol or a long range wide area network protocol. Further, the communication system includes a remote server computing device positioned offsite of the parking facility.

The gateway device and the remote server computing device wirelessly communicate between each other using the ultra-wide band protocol or the long range wide area network protocol. It should be appreciated that the ultra-wide band protocol and/or the long range wide area network protocol permits communication amongst the various components of the communication system such that a construction material of the parking facility minimally interferes with the wireless transmitting of data between the various components and the remote server computing device. The communication systems described herein are robust to work in extreme environments, such as parking facilities, where the electronic components may be surrounded by building materials not conducive for wireless applications (e.g., rebar in the concrete structure and a plurality of vehicles). As such, the communication system described herein does not need to be hardwired to an onsite server and resolves the issues of unreliable wireless communication.

Example embodiments and features of parking facility communication systems and methods are described below.

As used herein, the term "communication" and/or "communicatively coupled" means that coupled components are capable of exchanging data signals and/or electric signals with one another such as, for example, data signals transmitted wirelessly, electrical signals via conductive medium, electromagnetic signals via air, optical signals, via optical waveguides electrical energy via conductive medium or a non-conductive medium, and the like.

As described herein, "minimally interferes" means that the construction material of the gate assembly, the parking facility, vehicles, and the like, does not prevent the transmission of data between an on-site controller and an offsite remote sever, as shown in Table 1 below, compared with a wireless internet, WI-Fi, and the like, as shown in table 2 below. That is, while the construction material of the gate assembly, the parking facility, vehicles, and the like, may weaken, distort, change or modify the transmission standards and/or power standards of the wireless transmission such as a wireless data, a power, and/or electrical signals, utilizing ultra-wide band protocols, long range wide area network protocols, narrowband-internet of things protocols, and/or Sigfox protocols, permits the transmission of data through these environments. That is, the weaken signal of the ultra-wide band, long range wide area network, narrowband-internet of things, and/or Sigfox protocols is significantly less than weaken signal of Wi-fi, Internet, cellular service, and the like. As such, in the same environment, Wi-fi, Internet, cellular service, and the like, cannot transmit or receive data from an offsite server based on a weak and/or significantly reduced signal strength, as shown in Table 2 below, while the ultra-wide band, long range wide area network, narrowband-internet of things, and/or Sigfox protocols are able to transmit and receive data, as illustrated in Table 1 below.

With reference to Tables 1 and 2 below, it should be appreciated that the scanned values gathered using the long range wide area network protocol and the Wi-Fi protocol were gathered from a gate controller positioned inside a gate housing and within a parking faculty. For the long range wide area network protocol, it should be understood that RSSI is the received signal strength indicator, SNR is a signal to noise ratio and sf (spreading factor) is the amount of spreading code applied to the original data signal. Further, it should be understood that the RSSI is approximately 30 dB, the SNR is 0 dB, at a spread factor of 7 in the long range wide area network protocol without any interference. Further, it should be understood that the signal level is approximately 100/100 dB in the Wi-Fi network protocol without any interference.

TABLE 1

| LoRaWAN | Spread Factor | RSSI (dB) | SNR (dB) |
|---|---|---|---|
| | Sf10 | −95 | 4 |
| | Sf10 | −115 | −4 |
| | Sf12 | −95 | 4 |
| | Sf12 | −110 | 3 |
| | Sf8 | −99 | 0 |

TABLE 2

| Protocol | Frequency | Signal Level (dB) |
|---|---|---|
| IEEE 802.11AC IEEE 802.11i/WPA2 Version 1 | 5.745 GHz | 13/100 |
| IEEE 802.11bgn IEEE 802 11i/WPA2 Version 1 | 2.412 GHz | 19/100 |
| IEEE 802.11bgn IEEE 802 11i/WPA2 Version 1 | 2.462 GHz | 14/100 |
| IEEE 802.11AC IEEE 802.11i/WPA2 Version 1 | 5.18 GHz | 12/100 |
| IEEE 802.11AC IEEE 802.11i/WPA2 Version 1 | 5.785 GHz | 14/100 |

Referring now to the drawings, FIG. 1 depicts an illustrative communication system 10 for a parking facility according to embodiments shown and described herein. The illustrative communication system 10 includes an example parking facility 20, a gateway device 30 and a remote server computing device 40 positioned offsite from the example parking facility 20. The remote server computing device 40 is configured to wirelessly communicate with various components of the parking facility 20, as described in greater detail herein.

In some embodiments, an ultra-wide band (UWB) protocol is utilized as the wireless communication protocol between the remote server computing device 40 and the various components of the example parking facility 20. The UWB protocol may be a low energy level radio transmission for short-range, high-bandwidth communications over a large portion of the radio spectrum.

In other embodiments, a long range wide area network (LoRa®) protocol is utilized as the wireless communication protocol between the remote server computing device 40 and the various components of the example parking facility 20. The LoRa® protocol is a long range, low power wireless platform that enables smart Internet-of-Things (IoT) applications to have secure data transmission using gateway devices to relay messages between end-devices and a central network server, such as the remote server computing device 40. Further, the gateway devices may be connected to the remote server computing device 40 via standard IP connections and act as a transparent bridge, converting RF packets to IP packets and vice versa. As such, a gateway device 30 may illustratively be positioned in a communication path between the remote server computing device 40 and the various components of the example parking facility 20, as discussed in greater detail herein.

In other embodiments, a narrowband-internet of things (NB-IoT) protocol or a Sigfox protocol is utilized as the wireless communication protocol between the remote server computing device 40 and the various components of the example parking facility 20. The NB-IoT protocol may be a narrowband cellular-grade wireless technology that may send and receive small amounts of data. Sigfox may be a narrowband or ultra-narrowband technology that uses a standard radio transmission such as binary phase-shift keying (BPSK) and utilizes narrow chunks of spectrum and changes the phase of the carrier radio wave to encode the data. This allows the receiver to only listen in a tiny slice of spectrum, which mitigates the effect of noise. Sigfox communication may be bidirectional.

In some embodiments, the illustrative communication system 10 further includes a vehicle 50 and/or a user interface device 60. The example parking facility 20 may receive data from one or more sources such as from the vehicle 50, the user interface device 60, the gateway device 30 and/or the remote server computing device 40. Further, the example parking facility 20 may generate data such as vehicle identification information data from the vehicle 50 (e.g., license plate, permit number, and the like) at the example parking facility 20, store data, and/or provide data to the user interface device 60 and the remote server computing device 40, as discussed in greater detail herein. In some embodiments, the example parking facility 20 may employ Bluetooth® and the like, for the purposes of identifying the vehicle 50, a user via the user interface device 60, and the like, as discussed in greater detail herein. Further, in some embodiments, the example parking facility 20 and/or components thereof may perform one or more computing functions, such as receiving data, capturing image data, processing data, storing data and the like, for permitting a vehicle access into or to exit the parking facility, as described in greater detail herein.

The vehicle 50 may generally be any vehicle with one or more onboard computing devices, particularly computing devices that contain hardware for receiving data, processing data, storing data, and/or transmitting data. Thus, the vehicle 50 and/or components thereof may perform one or more computing functions, such as receiving data, capturing image data, processing data, storing data and the like for identifying the vehicle and/or providing unique vehicle identification information data (e.g., license plates, VIN, and the like), such that the vehicle may be granted access or exit authorization from the example parking facility 20, as described in greater detail herein.

The user interface device 60 may generally be used as an interface between the user and the other components connected to the illustrative communication system 10, such as the example parking facility 20. Thus, the user interface device 60 may be used to perform one or more user-facing functions, such as receiving one or more inputs from the user or providing information to the user, as described in greater detail herein. Accordingly, the user interface device 60 may include at least a display and/or input hardware. The user interface device 60 may be used to input data into the illustrative communication system 10 and components thereof, such as the example parking facility 20. For example, the user interface device 60 may request for entry or exit authorization from the example parking facility 20, as discussed in greater detail herein. As such, the user interface device 60 may contain software programming that relates to determining the location of the user (i.e., at which gate of the example parking facility for those that have more than one entry and/or exit locations), syncing with the example parking facility 20 or components thereof, and the like.

The remote server computing device 40 is positioned offsite from the example parking facility 20 and may receive data from one or more sources, generate data, store data, index data, and/or provide data to the gateway device 30 and/or the example parking facility 20 (or components thereof). It should be understood that "offsite" as used herein means that the remote server computing device 40 is located at some other place other than at the example parking facility 20 and thus wirelessly communicates with the example parking facility 20 (or components thereof). For example, the remote server computing device 40 is positioned in a different building, a different complex, a different compound, or beyond a particular distance (e.g., more than 100 feet, 100 yards, or the like). As such, in some embodiments, it should be understood that the remote server computing device 40 is not in the same vicinity as the example parking facility 20.

In some embodiments, the remote server computing device 40 may employ one or more algorithms that are used for the purposes of analyzing data that is received from the vehicle 50, the user interface device 60, the example parking facility 20, and the like, such as whether the vehicle at the parking facility 20 is authorized to enter and/or exit the example parking facility 20, and the like. As such, it should be appreciated that the remote server computing device 40 may function with the example parking facility 20 (or components thereof) and/or vehicles to employ the one or more algorithms.

Figure 2:
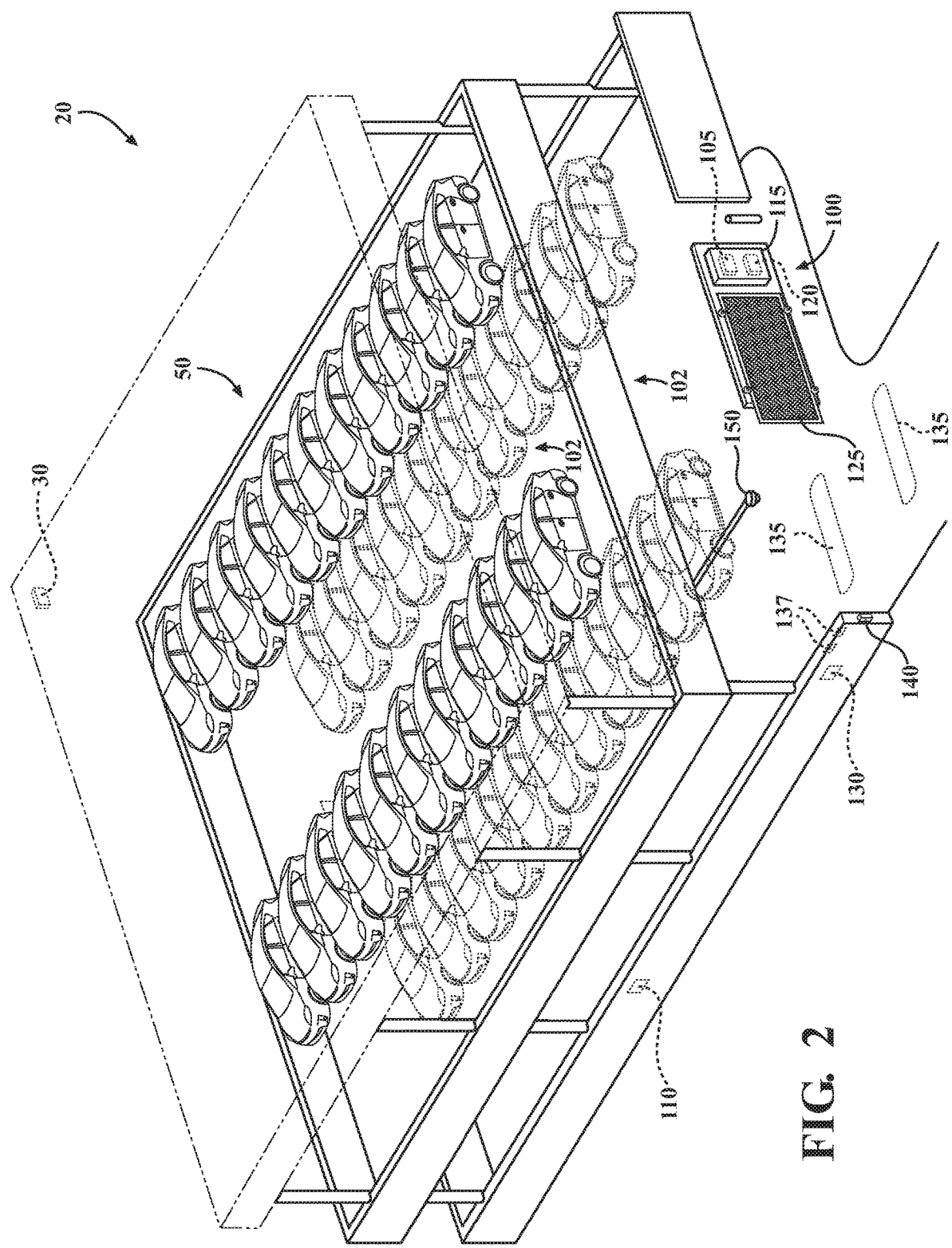
FIG. 2 schematically depicts an illustrative parking facility of the parking facility communication system of FIG. 1 according to one or more embodiments described and illustrated herein.

Now referring to FIGS. 1 and 2, the remote server computing device 40 off-loads some of the computing processes from the example parking facility 20 (or components thereof) onto other components within the illustrative communication system 10. In some embodiments, components of the example parking facility 20 includes an on-premise computing device 105, such as a gate controller, that is communicatively coupled to the remote server computing device 40, as discussed in greater detail herein. As such, the on-premise computing device 105 may communicate with the gateway device 30 by wireless connection using the UWB protocol, the LoRa protocol, the NB-IoT protocol, the Sigfox protocol, and/or another known or yet to be known protocol, as indicated by a first communications connection A between the on-premise computing device 105 and the gateway device 30. In some embodiments, a peripheral device 110, such as a long range transmitter/receiver device, is positioned in the communication path between the on-premise computing device 105 and the gateway device 30 such that first communications connection A is between the on-premise computing device 105, the peripheral device 110 and the gateway device 30.

As used herein, the term "on-premise" means that the computing device 105 is located within a general vicinity of the example parking facility 20. For example, the on-premise computing device 105 may be located in the same facility, in the same building, in the same complex, in the same compound, within a particular distance (e.g., within 100 feet, 100 yards, or the like). It should be understood that "on-premise" specifically excludes remote server computing devices that are not in the same vicinity of the example parking facility 20. Further, in some embodiments, the peripheral device 110 is an on-premise device.

Now referring back to FIG. 1, communications between the user interface device 60 or the vehicle 50 and the on-premise computing device 105 is indicated by a second communications connection B. In some embodiments, the second communications connection B is via a Bluetooth® protocol, a wired connection, and the like. A third communications connection C between the gateway device 30 and the remote server computing device 40 is wireless and uses the UWB protocol, the LoRa protocol, the NB-IoT protocol, the six fox protocol, and/or another known or yet to be known protocol. As such, the first communications connection A and the third communications connection C are identical and data is transferred between the first communications connection A and the third communications connection C using the UWB protocol, the LoRa protocol, the NB-IoT protocol, the Sigfox protocol, and/or another known or yet to be known protocol.

Now referring back to FIGS. 1 and 2, it should be appreciated that in other embodiments, the gateway device 30 and/or the peripheral device 110 does not need to wireless communicate with the remote server computing device 40. It should be appreciated that the verification may be completed locally or remotely and is only limited by the distance that the UWB, LoRa®, Sigfox, and/or NB-IoT protocols travel. For instance, in this embodiment, the remote server computing device 40 may be located in the example parking facility 20 or the remote server computing device 40 may be at an office or other structure many miles away from the example parking facility 20. Once validated, the gateway device 30 may receive and forward an instructional signal to the gate controller 105 via the peripheral device 110 to provide an instruction to move a gate 125 of the parking facility 20 into the open position and allow the user and the vehicle 50 to enter or exit the example parking facility 20.

Referring back to FIG. 1, in some embodiments, the illustrative communication system 10 for the example parking facility 20 may further include a network 70. The network 70 may include a wide area network (WAN), such as the Internet, a local area network (LAN), a mobile communications network, a public service telephone network (PSTN), a personal area network (PAN), a metropolitan area network (MAN), a virtual private network (VPN), Bluetooth network, a low power LAN (LPAN), the UWB, and/or another network. The network 70 may generally be configured to electronically connect one or more devices such as computing devices and/or components thereof, with the remote server computing device 40 and/or components thereof, as illustrated by a fourth communications connection D. Illustrative computing devices may include, but are not limited to, an administrative user computing device 80.

The administrative user computing device 80 may generally be used as an interface between the remote server computing device 40 and the other components connected to the network 70. Thus, the administrative user computing device 80 may be used to perform one or more user-facing functions. Accordingly, the administrative user computing device 80 may include at least a display and/or input hardware. Further, in the event that the remote server computing device 40 requires oversight, updating, and/or correction, the administrative user computing device 80 may be configured to provide the desired oversight, updating, and/or correction. The administrative user computing device 80 may also be used to input additional data into a corpus of data stored on the remote server computing device 40. For example, the administrative user computing device 80 may contain software programming or the like that relates to viewing, interpreting, providing and/or updating information data, such as adding or deleting data from the remote server computing device 40 with regards to authorized vehicles or users, and the like.

It should be understood that while the user interface device 60 is depicted as a personal electronic device, the remote server computing device 40 is depicted as a server, and the administrative user computing device 80 as a personal computer, these are non-limiting examples. In some embodiments, any type of computing device (e.g., mobile computing device, personal computer, server, etc.) may be used for any of these components. Additionally, while each of these computing devices is illustrated in FIG. 1 as a single piece of hardware, this is also merely an example. Each of the user interface device 60, the remote server computing device 40, and the administrative user computing device 80 may represent a plurality of computers, servers, databases, components, and/or the like.

Now referring back to FIG. 2, the example parking facility 20 is schematically depicted. In some embodiments, the example parking facility 20 is a gated parking facility to restrict or limit access to only authorized vehicles and/or users. Further, in some embodiments, the parking facility 20 may be a multi-level structure having a plurality of parking floors or levels in which vehicles 50 may be parked. In a non-limiting example, all of the plurality of floors or levels in which vehicles may be parked are positioned below a surface of a ground. In another non-limiting example, all of the plurality of floors or levels in which vehicles may be parked are positioned above the surface of the ground. In another non-limiting example, some of the plurality of floors or levels in which vehicles may be parked are positioned below the surface of the ground while others are positioned above the surface of the ground. In other embodiments, the parking facility 20 may be a single-level structure positioned below or above the surface of the ground.

It should be understood that regardless of whether the example, parking facility 20 is a single level or multi-level structure, the example parking facility 20 is constructed of a steel frame, rebar, concrete, cement, and/or other construction materials that inherently affect traditional Wi-Fi, internet, and other wireless signals and/or data transmission. As such, it is difficult to use wireless communication in or at the parking facility 20 without interference from the construction materials. This creates an unreliable wireless connection.

The example parking facility 20 further includes at least one parking area 102 and a gate assembly 100. The gate assembly 100 includes a housing 115 that is generally a metal material such as steel, iron, and the like. In some embodiments, the housing 115 may include concrete, cement, and other materials. The housing 115 generally houses a gate actuator 120 and the on-premise computing device 105, hereinafter referred to as "the gate controller 105". The gate assembly 100 further includes the gate 125. The gate 125 is movable between an open position, as best seen in FIG. 2, and a closed position by the gate actuator 120. That is, the gate actuator 120 receives a gate open or a gate close command from the gate controller 105, which in turn actuates to move the gate 125 between the open and closed positions depending on the command received. It should be understood that when the gate 125 is in the open position, entry or exit from the parking facility 20 is permitted. When the gate 125 is in the closed position, entry or exit from the parking facility 20 is prohibited.

In some embodiments, the gate 125 is coupled to the housing 115. In other embodiments, the gate 125 is coupled to some other structure within the example parking facility 20. Further, in some embodiments, the gate 125 may be pivotally coupled to the housing 115 and/or to some other structure within the example parking facility 20 such that the gate 125 is pivoted to move between the open and closed positions. In other embodiments, the gate 125 may be slidably coupled to the housing 115 and/or to some other structure within the example parking facility 20 such that the gate 125 is slidably moves between the open and closed positions.

Still referring to FIG. 2, the gate controller 105 may receive and/or transmit a plurality of local signals (e.g. from the vehicle 50 and/or the user interface device 60 of FIG. 1). Further, the gate controller 105 may receive and/or transmit a plurality of wireless long range signals. In some embodiments, the plurality of wireless long range signals are generated from the gate controller 105 and terminate at the remote server computing device 40 (FIG. 1), as discussed in greater detail herein. In other embodiments, the plurality of wireless long range signals are generated from the remote server computing device 40 (FIG. 1) and terminate at the gate controller 105, as discussed in greater detail herein. In either embodiment, the wireless long range signals may be transmitted through the various components of the example parking facility 20 using UWB, LoRa®, NB-IoT, and/or Sigfox protocols.

In some embodiments, the gate assembly 100 further includes the peripheral device 110, such as a long range transmitter/receiver device. The peripheral device 110 is communicatively coupled to the gate controller 105 and to the gateway device 30. The peripheral device 110 is configured to receive and transmit the plurality of wireless long range signals that are generated from the gate controller 105 and terminate at the remote server computing device 40 (FIG. 1) and/or that are generated from the remote server computing device 40 (FIG. 1) and terminate at the gate controller 105, as discussed in greater detail herein. Further, the peripheral device 110 is configured to receive and transmit signals and data using UWB, LoRa®, and/or Sigfox protocols.

Still referring to FIG. 2, in some embodiments, the gate assembly 100 further includes a gate peripheral device 130, such as a short range transmitter/receiver device. The gate peripheral device 130 is communicatively coupled to the gate controller 105. The gate peripheral device 130 is configured to receive and transmit the plurality of wired and/or wireless local signals, such as short range signals, that are generated from the gate controller 105 and terminate at the vehicle 50 and/or the user interface device 60 and/or that are generated from the vehicle 50 and/or the user interface device 60 (FIG. 1) and terminate at the gate controller 105, as discussed in greater detail herein. Further, the gate peripheral device 130 is configured to receive and transmit the local signals between the vehicle 50, the user interface device 60 (FIG. 1) and the gate controller 105 via a Bluetooth® protocol.

In some embodiments, the gate assembly 100 further includes a vehicle detection/identification sensor 135 that is communicatively coupled to the gate controller 105. In some embodiments, the vehicle detection/identification sensor 135 may be a loop embedded within a floor surface of the example parking facility 20 near or adjacent to the gate 125. The loop may be an induction sensor that is configured to determine when the vehicle 50 is at the gate 125. In other embodiments, the vehicle detection/identification sensor 135 may be a proximately sensor, a laser sensor, and the like, generally illustrated at 137, that uses motion or other methods to determine whether the vehicle 50 is present at the gate 125 and may capture data to identify the vehicle 50. The vehicle detection/identification sensor 135 is configured to output or transmit a vehicle present signal and/or identification data to the gate controller 105.

In some embodiments, the gate assembly 100 further includes a quick response (QR) device 140 that is communicatively coupled to the gate controller 105. In some embodiments, the QR device 140 may be any commercially available device that is configured to read and/or scan unique QR codes, barcodes, and the like. As such, it should be appreciated that the QR device 140 may assist in identifying the vehicle and/or the user by transmitting or outputting a unique code to the gate controller 105, which in turn may communicate with the remote server computing device 40 (FIG. 1) to determine whether the vehicle and/or the user is authorized to enter and/or exit the example parking facility 20, as discussed in greater detail herein.

In some embodiments, the gate assembly 100 further includes at least one image capturing device 150 that is communicatively coupled to the gate controller 105. In some embodiments, the least one image capturing device 150 may be any imaging device, sensor, or detector that is suitable for obtaining images. As used herein, the term "images" or "image" refers to video images (i.e., a sequence of consecutive images), still images (including still images isolated from video images), and/or image data. Any suitable commercially available image capturing device may be used without departing from the scope of the present disclosure. In some embodiments, the at least one image capturing device 150 may be coupled to one or more other components that provide additional functionality for imaging, such as, for example, one or more sensors.

The at least one image capturing device 150 may include or may be coupled to a lens (not shown). The lens is not limited by this disclosure and may generally be any optical component that is configured to focus the light entering the at least one image capturing device 150 such that an image can be properly obtained. In some embodiments, the lens may be a fixed lens that is not adjustable. In other embodiments, the lens may be adjustable, either manually or automatically by the gate controller 105, to zoom in on an object, zoom out on an object, and/or adjust the focus of the light entering the at least one image capturing device 150.

As such, it should be appreciated that the least one image capturing device 150 may assist in identifying the vehicle and/or the user by transmitting or outputting images to the gate controller 105, which in turn may communicate with the remote server computing device 40 (FIG. 1) to determine whether the vehicle and/or the user is authorized to enter and/or exit the example parking facility 20, as discussed in greater detail herein.

It should be appreciated that the vehicle detection/identification sensor 135, the QR device 140, and/or the at least one image capturing device 150 may be configured to capture a parking permit, a license plate, a barcode, and/or other unique identifiers, and transfers the captured data to the gate controller 105, which then transfers the identification data to the remote server computing device 40 (FIG. 1) to verify whether the data is authorized. It should be appreciated that in some embodiments, the vehicle detection/identification sensor 135, the QR device 140, and/or the at least one image capturing device 150 is wired to the gate controller 105. In other embodiments, the vehicle detection/identification sensor 135, the QR device 140, and/or the at least one image capturing device 150 may communicate with the gate controller 105 wirelessly.

Figure 3:
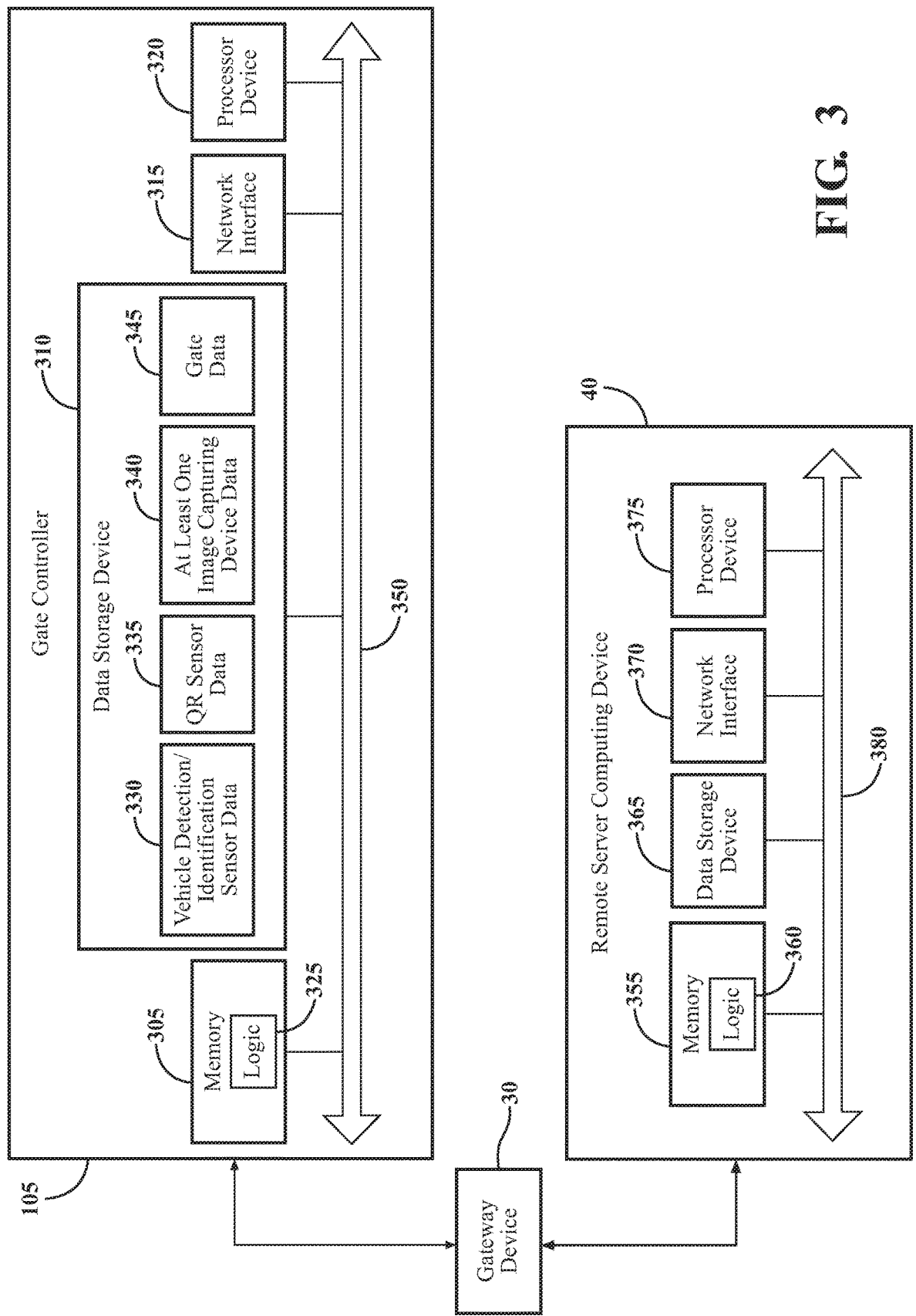
FIG. 3 schematically depicts a block diagram of illustrative components of the computing network for the parking facility communication system of FIG. 1 according to one or more embodiments shown or described herein.

Now referring to FIG. 3, various illustrative internal components of the gate controller 105 and internal components of the remote server computing device 40 are schematically illustrated. More specifically, the gate controller 105 may be communicatively coupled to the remote server computing device 40 via the gateway device 30. In some embodiments, the gate controller 105 may be communicatively coupled to the remote server computing device 40 via the peripheral device 110 and then the gateway device 30. As such, the UWB protocol, the LoRa® protocol, the NB-IoT protocol, and/or the Sigfox protocol may be used to communicate data between the internal components of the gate controller 105 and internal components of the remote server computing device 40.

As such, it should be appreciated that these protocols permit the transfer of communication or data signals through the construction materials of the example parking facility 20 (FIG. 2) from the internal components of the gate controller 105 to the internal components of the remote server computing device 40, as discussed in greater detail herein. That is, the construction materials of the example parking facility 20 (e.g., concrete, metal, rebar, and the like) do not interfere with the transmission and/or receiving of data when using the UWB protocol, the LoRa® protocol, the NB-IoT protocol, and/or the Sigfox protocol.

In various embodiments, the gate controller 105 may include, but is not limited to, a memory component 305, a data storage device 310, a network interface 315, and a processor device 320. A local interface 350, such as a bus or the like, may interconnect the various components.

The processor device 320, such as a computer processing unit (CPU), may be the central processing unit of the gate controller 105, performing calculations and logic operations to execute a program. The processor device 320, alone or in conjunction with the other components, is an illustrative processing device, computing device, processor, or combination thereof. The processor device 320 may include any processing component configured to receive and execute instructions (such as from the memory component 305).

Still referring to FIG. 3, in some embodiments, the memory component 305 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. Further, the memory component 305 may be a non-transitory, processor-readable memory. The memory component 305 may include one or more programming instructions thereon that, when executed by the processor device 320, cause the processor device 320 to complete various processes, such as one or more of the processes described herein with respect to FIG. 4.

The programming instructions stored on the memory component 305 may be embodied as the one or more software logic modules 325, where each logic module 325 provides programming instructions for completing one or more tasks, as described in greater detail below with respect to FIG. 4. The logic module 325 includes a plurality of different pieces of logic, each of which may be embodied as a computer program, firmware, and/or software/hardware, which may be executable by the processor device 320. For example, the logic module 325 may include a plurality of different pieces of logic with respect to transmitting received local signals (i.e., those form the vehicle detection/identification sensor 135, the QR device 140, and the at least one image capturing device 150 of FIG. 2) to the remote server computing device 40 using the wireless long range protocols (i.e., UWB, LoRa®, NB-IoT, and/or Sigfox). Further, the logic module 325 may include a plurality of different pieces of logic with respect to actuating the gate actuator 120 (FIG. 2).

Still referring to FIG. 3, the network interface hardware 315 may include any wired or wireless networking hardware, such as a modem, a LAN port, a wireless fidelity (Wi-Fi) card, WiMax card, mobile communications hardware, antenna, and/or other hardware for communicating with other networks and/or devices. For example, the network interface hardware 315 may provide a wireless communications link between the gate controller 105 and the other components of the communication system 10 (FIG. 1) such as the gateway device 30, the peripheral device 110 (FIG. 2), the remote server computing device 40, and the like. That is, in embodiments, the network interface hardware 315 is configured to transmit and/or receive signals from the gateway device 30 and/or the peripheral device 110 using the UWB protocol, the LoRa® protocol, the NB-IoT protocol, and/or the Sigfox protocol.

The transmitted and/or received signal may be transformed into a data signal indicative of a gate command, whether access is permitted to allow the vehicle 50 to enter and/or exit the example parking facility 20 (FIG. 2), and the like. It should be appreciated that other data may transmitted and/or received such as identification data, entry and exit time, payment data, and the like.

Further, the vehicle detection/identification sensor 135, the QR device 140, and/or the at least one image capturing device 150 (FIG. 2) may be communicatively coupled to the gate controller 105. The vehicle detection/identification sensor 135, the QR device 140, and/or the at least one image capturing device 150 (FIG. 2) may be configured to capture unique identification of the vehicle 50 (FIG. 1), the user, the user interface device 60 (FIG. 1), and the like. For example, unique identification may be a parking permit, a license plate, a barcode, and/or other unique identifiers. The vehicle detection/identification sensor 135, the QR device 140, and/or the at least one image capturing device 150 (FIG. 2) output captured data to the gate controller 105, as a vehicle detection/identification sensor data 330, a QR device data 335, and at least one image capturing device data 340.

Still referring to FIG. 3, the gate controller 105 processes the received data and then wirelessly transmits the pertinent data of the identification data to the remote server computing device 40, via the gateway device 30, to verify whether the data is authorized. It should be appreciated that, in some embodiments, the gate controller 105 and components thereof, may not transfer all the captured identification data, but instead, due to the constraints of the UWB protocol the LoRa® protocol, the NB-IoT protocol, and/or Sigfox protocol, determine the most pertinent data of the identification data and transmit that data only. It should be understood that as the UWB protocol, the LoRa® protocol, the NB-IoT protocol, and/or the Sigfox protocol improve in data transfer capabilities, more of the identification data may be transmitted.

Further, the data storage device 310 may store a gate data 345. The gate data 345 may be data related to the gate 125 (FIG. 2) such as whether the gate 125 (FIG. 2) is currently in the open or closed position, a type of gate, a mounting or coupling position of the gate (e.g., whether the gate is a pivot type, a slide type, and the like). The data storage device 310 may also store information or data received from the remote server computing device 40 such as a gate command in the gate data 345. The gate command may be an instruction or command to open or close the gate 125 (FIG. 2) based on a determination at the remote server computing device 40, as discussed in greater detail herein.

Still referring to FIG. 3, in various embodiments, the remote server computing device 40 may include, but is not limited to, a memory component 355, a data storage device 360, a network interface 370 and a processor device 375. A local interface 380, such as a bus or the like, may interconnect the various components.

The processor device 375, such as a computer processing unit (CPU), may be the central processing unit of the remote server computing device 40, performing calculations and logic operations to execute a program. The processor device 375, alone or in conjunction with the other components, is an illustrative processing device, computing device, processor, or combination thereof. The processor device 375 may include any processing component configured to receive and execute instructions (such as from the memory component 355).

Still referring to FIG. 3, in some embodiments, the memory component 355 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. Further, the memory component 355 may be a non-transitory, processor-readable memory. The memory component 355 may include one or more programming instructions thereon that, when executed by the processor device 375, cause the processor device 375 to complete various processes, such as one or more of the processes described herein with respect to FIG. 4.

The programming instructions stored on the memory component 355 may be embodied as the one or more software logic modules 360, where each logic module 360 provides programming instructions for completing one or more tasks, as described in greater detail below with respect to FIG. 4. The logic module 360 includes a plurality of different pieces of logic, each of which may be embodied as a computer program, firmware, and/or software/hardware, which may be executable by the processor device 375. For example, the logic module 360 may include a plurality of different pieces of logic with respect interpreting received wireless data transmissions from the gate controller 105 (i.e., received local signals from the vehicle detection/identification sensor 135, the QR device 140, and the at least one image capturing device 150) using the wireless long range protocols (i.e., UWB, LoRa®, NB-IoT, and/or Sigfox).

Further, the logic module 360 may include a plurality of different pieces of logic to determine whether the data transmitted by the gate controller 105 pertains to an authorized vehicle or user such that the gate 125 (FIG. 2) of the parking facility 20 (FIG. 2) should be moved into the open position. The logic module 360 may include a plurality of different pieces of logic to transmit the gate command to the gate controller 105 to move the gate 125 (FIG. 2) into the open or closed positions.

Still referring to FIG. 3, the network interface hardware 370 may include any wired or wireless networking hardware, such as a modem, a LAN port, a wireless fidelity (Wi-Fi) card, WiMax card, mobile communications hardware, antenna, and/or other hardware for communicating with other networks and/or devices. For example, the network interface hardware 370 may provide a wireless communications link between the remote server computing device 40 and the other components of the communication system 10 (FIG. 1) such as the gateway device 30, the peripheral device 110 (FIG. 2), the gate controller 105, and the like. That is, in embodiments, the network interface hardware 370 is configured to transmit from the remote server computing device 40 to other components of the communication system 10 (FIG. 1) and/or receive signals from other components of the communication system 10 (FIG. 1) (e.g., the gateway device 30, the peripheral device 110 (FIG. 2), the gate controller 105, and the like) using the UWB protocol, the LoRa® protocol, the NB-IoT protocol, and/or the Sigfox protocol.

The transmitted and/or received communications may be transformed into a data signal indicative of a gate command, whether access is permitted to allow the vehicle 50 to enter and/or exit the example parking facility 20 (FIG. 2), and the like. It should be appreciated that other data may transmitted and/or received such as identification data, entry and exit time, payment data, and the like.

In some embodiments, the network interface hardware 370 is configured to transmit and receive data between the remote server computing device 40 and the administrative user computing device 80 via the network 70. As such, the administrative user computing device 80 may update the various components of the remote server computing device 40 with data related to authorized vehicles and/or users, stored payment information, and the like.

Still referring to FIG. 3, the data storage device 365 of the remote server computing device 40 may store information or data related to the unique identification of the vehicle 50 (FIG. 1), the user, the user interface device 60 (FIG. 1), and the like. For example, unique identification may be a parking permit, a license plate, a barcode, and/or other unique identifiers. As such, when the pertinent data of the identification data is received by the remote server computing device 40, the data storage device 365 may be cross referenced to determine whether the received unique information corresponds to an authorized vehicle or user.

Further, the data storage device 365 may store data related to the number of entries and exits, the capacity of the parking facility 20 (FIG. 2), payment information, peak times of entry and exit, and the like. Further, data related to the gate 125 (FIG. 2) may be stored in the data storage device 365 such as whether the gate 125 (FIG. 2) is currently in the open or closed position, a type of gate, a mounting or coupling position of the gate (e.g., whether the gate is a pivot type, a slide type, and the like), the amount of time it is taking for the gate to open and close for maintenance purposes, and the like.

As mentioned above, the various components described with respect to FIG. 3 may be used to carry out one or more processes for parking facility communication system that enables wireless communication from the parking facility to a remote server computing device regardless of the construction material of the gated parking facility and without structural modifications to the parking facility.

Now referring to FIG. 4, a flowchart of an illustrative method 400 of requesting to enter and/or exit the parking facility is schematically depicted. In some embodiments, the gate controller, the gateway and the remote server computing device may all be in continuous communication to execute the various steps depicted in FIG. 4. The various components may monitor for a user input that corresponds to an initiation for entry into or to exit the gated parking facility, such as the user initiates a request via the user interface or the QR device, at block 405. In a non-limiting example, the user may use a software application on the user interface to initiate the request to enter and/or exit the parking facility using Bluetooth® protocol. In another non-limiting example, the user may scan a unique barcode either on a parking permit, on the user interface, and the like to initiate the request to enter and/or exit the parking facility in which the data is transferred using Bluetooth® protocol and/or may be hardwired. In yet another non-limiting example, the user and/or vehicle may merely approach the gate to initiate the request to enter and/or exit the parking facility in which the vehicle detection/identification sensors and/or the at least one image capturing device may capture data about the user and/or the vehicle. As such, unique identification data may be used during the initiation for entry into or to exit the gated parking facility.

Once the input is received, the gate controller determines that an entry or exit request has been initiated, at block 410, and the gate controller wirelessly transmits an authorization request to the peripheral device using the UWB protocol, the LoRa® protocol, the NB-IoT protocol, and/or the Sigfox protocol, at block 415. It should be appreciated that the authorization request includes only the pertinent data of the identification data. The peripheral device wirelessly transmits the authorization request to the gateway device using the UWB protocol, the LoRa® protocol, the NB-IoT protocol, and/or the Sigfox protocol, at block 420 and the gateway device wirelessly transmits the authorization request to the remote server computing device using the UWB protocol, the LoRa® protocol, the NB-IoT protocol, and/or the Sigfox protocol, at block 425.

At block 430, the remote server computing device uses the pertinent data of the information data to verify whether the request is for an authorized user or vehicle and a gate open request is authorized. For example, the remote server computing device may verify a registration, a reservation, and the like utilizing the pertinent data of the information data. In another example, the remote server computing device may verify a successful payment for entry or exit of the parking facility. At block 435, the remote server computing device determines whether the gate open request is authorized. If the gate open request is not authorized at block 435, the method 400 ends at block 440.

If the gate open request is authorized at block 435, then the remote server computing device transmits a gate command to the peripheral device via the gateway device using the UWB protocol, the LoRa® protocol, the NB-IoT protocol, and/or the Sigfox protocol, at block 445. The gate open command is communicated with the gate controller from the peripheral device, at block 450, and, in response, the gate is moved into an open position at block 455.

It should be understood that embodiments are not limited to vehicles, and similar systems may be employed for motorcycles, boats, bicycles, airplanes, and the like, that are subjected to a gated entrance of a parking facility.

It should now be understood that the systems and methods described herein are directed to improved parking facility wireless communications where a wireless transmission of data between a gate system and a remote server computing device use the UWB protocol, the LoRa® protocol, the NB-IoT protocol, and/or the Sigfox protocol. Because the parking facility uses the UWB, NB-IoT, and/or Sigfox wireless communication protocols, structural modifications to the parking facility and/or hardwired devices are not necessary. Therefore, it is easier, cost effective, and doe not require preplanning and hardwiring to remotely monitor and provide access to authorized users and/or vehicles into and out of the parking facility.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle authorization system for a parking facility, the vehicle authorization system comprising:
   a vehicle or an electronic device of a user that transmits and receives a first data via a first protocol signal;
   a gate assembly comprising:
      a gate that is movable between an open position and a closed position,
      a gate actuator configured to move the gate, and
      a gate controller positioned at the gate and configured to:
         receive and transmit the first data via the first protocol signal, the first data is an identification data and the first protocol signal is a plurality of local signals, and
         receive and transmit a second data via a second protocol signal, the second data is a gate open authorization and the second protocol signal is wireless long range signals using an ultra-wide band protocol or a long range wide area network protocol, the first protocol signal is different from the second protocol signal, and
         actuate the gate actuator to move the gate,
   a communication system comprising:
      a remote server computing device that is positioned offsite from the parking facility,
      a peripheral device configured to receive and transmit the second data via the second protocol signal, the peripheral device positioned at the parking facility and communicatively coupled to and positioned as an intermediate device between the gate controller and a gateway device to provide a continuous signal path between the remote server computing device and the gate controller, the gateway device communicatively coupled to and between the peripheral device and the remote server computing device, wherein the gateway device and the remote server computing device are each configured to transmit and receive the second data via the second protocol signal to communicate with the peripheral device and the gate controller, and a gate transmitter/receiver device positioned at the parking facility and is communicatively coupled to the gate controller, the gate transmitter/receiver device is configured to receive and transmit the plurality of local signals to the gate controller after receiving a request signal from the vehicle or the electronic device of the user via a Bluetooth® protocol, wherein the remote server computing device provides the second data via the second protocol signal to the gate controller through the gateway device and the peripheral device such that a construction material of the parking facility minimally interferes with the second protocol signal.

2. The vehicle authorization system of claim 1, wherein the remote server computing device receives the second data via the second protocol signal initiated at the gate controller and through the peripheral device and through the gateway device such that the construction material of the parking facility minimally interferes with the wireless long range signals.

3. The vehicle authorization system of claim 1, wherein the gate assembly further includes a vehicle detection sensor that is communicatively coupled to the gate controller, and is configured to transmit a vehicle present signal to the gate controller.

4. The vehicle authorization system of claim 1, wherein the gate assembly further includes a quick response device that is communicatively coupled to the gate controller and is configured to capture and transmit a vehicle identification or a user identification to the gate controller.

5. The vehicle authorization system of claim 1, wherein the gate assembly further includes an image capturing device that is communicatively coupled to the gate controller and is configured to capture and transmit a vehicle identification to the gate controller.

6. The vehicle authorization system of claim 1, wherein the second protocol signal is a narrowband-internet of things protocol such that the gateway device is configured to transmit and receive the wireless long range signals using the narrowband-internet of things protocol.

7. A vehicle authorization system for a gated parking facility having a gate, the vehicle authorization system comprising:

a vehicle or an electronic device of a user that transmits an authorization data request via a first protocol signal;

a remote server computing device that is positioned offsite from the gated parking facility, the remote server computing device comprising:
  at least one processor;
  a memory communicatively coupled to the at least one processor; and
  machine readable instructions stored in the memory that cause the vehicle authorization system to perform at least the following when executed by the at least one processor:
    receive the authorization data request from a gateway device that is initiated at a gate transmitter/receiver device positioned at the parking facility, a gate controller positioned at the gate communicatively coupled to a peripheral device positioned in-line between the gateway device and the gate controller to provide a continuous signal path between the remote server computing device and the gate controller, the gate controller configured to receive and transmit via the first protocol signal to the gate transmitter/receiver device, the gate transmitter/receiver device is configured to receive and transmit the authorization data to the gate controller after receiving a request signal from the vehicle or the electronic device of the user via a Bluetooth® protocol, the gate controller configured to receive and transmit data to the gateway device via the peripheral device using a second protocol signal, the second protocol signal different from the first protocol signal,
    determine whether the authorization data request corresponds to an authorized vehicle in a data storage device, and
    send a gate command to the gate controller through the gateway device and the peripheral device based on whether the authorization data request corresponds to the authorized vehicle in the data storage device via the second protocol signal,
  wherein the first protocol signal is at least one of a plurality of local signals and the second protocol signal is wireless long range signals using an ultra-wide band protocol or a long range wide area network protocol, and
  wherein the peripheral device transmits to the gateway device, which in turn transmits the authorization data request to the remote server computing device using the second protocol signal and the remote server computing device transmits the gate command to the gate controller through the gateway device and the peripheral device using the second protocol signal such that a construction material of the gated parking facility and the gate thereof minimally interferes with the transmitting and receiving of the gate command.

8. The vehicle authorization system of claim 7, further comprising:
a gate assembly comprising:
  a gate actuator positioned configured to move the gate, and
  the gate controller that receives and transmits the second protocol signal and is configured to actuate the gate actuator to move the gate via the first protocol signal,
  wherein the gate is movable between an open position and a closed position.

9. The vehicle authorization system of claim 8, wherein:
the gateway device is communicatively coupled to the gate controller via the peripheral device,
wherein the gateway device is configured to receive the authorization data request from the gate controller via the peripheral device and transmit the authorization data request to the remote server computing device and is configured to receive the gate command from the remote server computing device and transmit the gate command to the gate controller via the peripheral device.

10. The vehicle authorization system of claim 9, wherein the authorization data request and the gate command are each transmitted and received using the ultra-wide band protocol or the long range wide area network protocol.

11. The vehicle authorization system of claim 9, wherein the second protocol signal is a narrowband-internet of things protocol such that the authorization data request and the gate command are each transmitted and received using the narrowband-internet of things protocol.

12. The vehicle authorization system of claim 8, wherein the gate command causes the gate controller to actuate the gate actuator to move the gate from the closed position to the open position.

13. The vehicle authorization system of claim 8, wherein the gate assembly further includes a vehicle detection sensor that is communicatively coupled to the gate controller and is configured to transmit a vehicle present signal to the gate controller.

14. The vehicle authorization system of claim 8, wherein the gate assembly further includes an quick response device that is communicatively coupled to the gate controller and is configured to capture and transmit a vehicle identification or a driver identification to the gate controller.

15. The vehicle authorization system of claim 8, wherein the gate assembly further includes an image capturing device that is communicatively coupled to the gate controller and is configured to capture and transmit a vehicle identification to the gate controller.

16. A method for a vehicle authorization system of a gated parking facility, the method comprising:
   initiating, by a request signal from a vehicle or an electronic device of a user via a Bluetooth® protocol, a request for a gate to open to a gate transmitter/receiver device positioned at the gated parking facility;
   transmitting, by gate transmitter/receiver device, the request signal to a gate controller, via a first protocol signal;
   transmitting the request for the gate to open through a peripheral device positioned at the parking facility to a gateway device then to a remote server computing device using a second protocol signal such that each of the gate controller, the peripheral device, the gateway device, and the remote server computing device communicate using the second protocol signal, the first protocol signal is different from the second protocol signal;
   determining, by the remote server computing device, whether the request for the gate to open is an authorized request;
   providing, by the remote server computing device, a gate command to the gateway device based on whether the request for the gate to open is authorized using the second protocol signal; and
   transmitting the gate command to the gate controller from the gateway device through the peripheral device,
   wherein the first protocol signal is at least one of a plurality of local signals and the second protocol signal is wireless long range signals using an ultra-wide band protocol or a long range wide area network protocol such that using the second protocol signal provides an uninterrupted signal such that a construction material of the gated parking facility and a gate thereof minimally interferes with the transmitting and receiving of the request for the gate to open or the gate command.

17. The method of claim 16, wherein the second protocol signal is a narrowband-internet of things protocol such that the request for the gate to open or the gate command are each transmitted and received using the narrowband-internet of things protocol.

* * * * *